June 27, 1967 — C. ROESCH — 3,327,509
ROLLER LEVELING
Filed May 10, 1966 — 9 Sheets-Sheet 1

INVENTOR.
CHRISTIAN ROESCH
BY
Brown, Critchlow, Flick & Peckham.
ATTORNEYS.

June 27, 1967 C. ROESCH 3,327,509
ROLLER LEVELING
Filed May 10, 1966 9 Sheets-Sheet

INVENTOR.
CHRISTIAN ROESCH
BY Brown, Critchlow,
Flick & Peckham
ATTORNEYS.

June 27, 1967  C. ROESCH  3,327,509
ROLLER LEVELING
Filed May 10, 1966  9 Sheets-Sheet 7

INVENTOR.
CHRISTIAN ROESCH
BY
Brown, Critchlow, Flick & Peckham
ATTORNEYS.

June 27, 1967  C. ROESCH  3,327,509
ROLLER LEVELING

Filed May 10, 1966  9 Sheets-Sheet 8

INVENTOR.
CHRISTIAN ROESCH
BY
Brown, Critchlow, Flick & Peckham
ATTORNEYS.

June 27, 1967  C. ROESCH  3,327,509
ROLLER LEVELING

Filed May 10, 1966  9 Sheets-Sheet 2

INVENTOR.
CHRISTIAN ROESCH
BY
Brown, Critchlow, Flick & Peckham
ATTORNEYS.

United States Patent Office 3,327,509
Patented June 27, 1967

3,327,509
ROLLER LEVELING
Christian Roesch, Middle Village, N.Y., assignor to Maust Machinery Corporation, a corporation of New York
Filed May 10, 1966, Ser. No. 554,267
31 Claims. (Cl. 72—162)

This invention relates to roller leveling in which work material in the form of metal strip is leveled and flattened by passing it between opposed banks of stagged work rolls that flex the material beyond its yield point. Although not limited thereto, the invention is particularly applicable to the tension leveling of continuous strip material in which the strip is subjected to substantial tension when passing through the leveler.

This application is a continuation-in-part of an application filed by Christian Roesch on Feb. 3, 1965, Ser. No. 430,120 and assigned to the same assignee.

A conventional roller leveler of this type includes two opposed banks of work rolls, the rolls of one bank being located in spaced, staggered relation to those of the other bank. The work rolls are generally of small diameter, so they are supported by rows of backing rolls to form a four-high or six-high roller leveler. In passing between the two banks of work rolls, the strip is repeatedly flexed beyond its elastic limit by alternately passing over and under successive work rolls that bend the strip in alternate half-waves transverse to the pass direction. The upper work rolls produce one series of half-waves, and the lower work rolls produce another series of half-waves. Such flexing of the strip beyond its yield point in a so-called "flat pass," and the concentrated flexing of "short" or tight areas of the strip beyond its yield point as a result of deflecting the work rolls selectively by means of adjustable back-up roll sections in a so-called "correction pass," combined in tension leveling with substantial tension on the strip, flattens and levels the strip. It also causes the strip to elongate slightly and progressively as it passes through the leveler. This elongation of the strip creates certain problems that this invention is intended to resolve.

In one type of leveler, the work rolls are all geared together and may be motor driven. In such a leveler, the peripheral or surface speed of the work rolls is the same throughout the length of the pass; and this speed approximates, but does not exactly equal the surface speed of the strip. Due to the slight and progressive elongation of the strip as it moves through the leveler, its linear speed increases slightly and progressively. The resulting slippage between rolls and strip increases roll wear, especially of the rolls near the exit side of the leveler where slippage is geratest. In addition, and more importantly, the increase in strip speed relative to roll speed tends to drive the rolls, along with their associated spindles and universal joints and gears, faster than the gearing between the rolls will allow them to go. This driving action of the strip causes the work rolls and their associated spindles, particularly at the exit side of the leveler, to "wind up" (in a manner similar to the action of a torsion bar when torque is applied to it) and then to "spring back" when the resistance of the rolls, spindles, etc., exceeds the winding torque exerted by the strip, thus introducing pulsating driveback loads into the gearing, which considerably shortens the life of the universal joints and causes excessive wear on the gears. In addition, the "wind-up" and "spring back" action of the exit work rolls produces shadow marks and cross streaks on the surface of the strip that may make it unfit for its intended use, particularly in precision leveling of aluminum and stainless steels having a mirror finish. All of these undesirable effects become worse as tension on the strip is increased, or when leveling degreased strip, because in each case the strip has a stronger frictional grip on the work rolls and applies greater winding torque, resulting in greater driveback loads.

To avoid these undesirable effects of strip elongation, some levelers have been made without gearing between the work rolls, so that the individual rolls are free to rotate at the speed at which they are driven by the strip in contact with them. In this type of leveler, the strip is pulled through the rolls under tension applied by a take-up reel or tension bridle. Paradoxically, such pull-through level have not been entirely successful, just because they have eliminated slippage between strip and work rolls. In the absence of slippage, the work rolls have a tendency to pick up oxide, dust, etc., from the strip and, if the rolls are not cleaned frequently, which involves additional expense and loss of operating time, the accumulation of particulate matter on the rolls will cause unacceptable marking of the strip surface.

To summarize, because of the slight and progressive elongation of the strip in passing through a roller leveler, (1) if the work rolls are geared together, the resulting speed differential between strip and rolls will cause the latter to "wind up," thereby producing surface imperfections on the strip and increased wear of the rotating parts of the leveler; and (2), if attempts are made to relieve this condition by providing a leveler with free-running work rolls, in which there is no speed differential between rolls and strip, the surface of the strip will still be marked, in this case because of dirt accumulating on the rolls that would not accumulate so rapidly if there were sufficient slippage between rolls and strip to make the rolls substantially self-cleaning.

It is accordingly among the objects of this invention to provide a roller leveler in which the speed differential between the strip and work rolls is reduced to the point that will avoid the disadvantageous results mentioned above, but is not reduced beyond the point that will assure adequate self-cleaning of the work rolls over long periods of operation.

A further object is to provide a roller leveler having the foregoing characteristics, in which the strip may either be pulled through the leveler, or driven through, or partly pulled and partly driven, with or without back tension.

Other objects will be apparent from the following description of a preferred embodiment of the invention, in connection with the attached drawings, in which

FIGS. 4a, b, and c, are diagrammatic views of the leveler of FIG. 3, as follows: FIG. 4a is a partial vertical exploded view, FIG. 4b is a vertical section of the rolls along the line b—b of FIG. 4a, and FIG. 4c is a sectional view of the roll gearing along the line c—c of FIG. 4a;

FIGS. 6a, b, and c, are diagrammatic views of the leveler of FIG. 5, as follows: FIG. 6b is a section of the rolls along the line b—b of FIG. 6a, and FIG. 6c is a sectional view of the roll gearing and overrunning clutches along the line c—c of FIG. 6a;

FIGS. 7a, b, and c, are diagrammatic views of a four-high leveler similar to those of the six-high leveler in FIGS. 4a, b, and c;

FIGS. 8a, b, and c, are diagrammatic views of a four-high leveler similar to FIGS. 7a, b, and c, but showing a modified drive arrangement between the rolls;

FIGS. 9a, b, and c, are diagrammatic views of a four-high leveler similar to FIGS. 7a, b, and c, but showing a further modified drive arrangement between the rolls;

FIGS. 10a, b, and c, are diagrammatic views of a six-high leveler similar to FIGS. 4a, b, and c, but showing a modified gearing arrangement between the rolls;

The present invention is based on the discovery that, if the speed differential between the strip and the work rolls of a roller leveler is kept substantially uniform (i.e., does not progressively increase towards the exit side of the leveler) and does not exceed a certain maximum differential, the resultant slippage between strip and work rolls will make the rolls self-cleaning but will not cause enough roll and spindle "wind up" to produce any observable surface defects on the strip or appreciable increased wear on the rotating parts of the leveler. In accordance with this invention, the work rolls are grouped together in clusters, each cluster including at least two adjacent work rolls that are interconnected by suitable drive means, such as gearing or chain, to assure their rotation at some fixed speed ratio, preferably a ratio that will produce the same surface speed in the work rolls of that cluster. In each roll cluster, from the entry to the exit side of the leveler, the work rolls within one cluster can, however, turn faster than the work rolls in the immediately preceding cluster. As a result, the speed differential between strip and work rolls will not become progressively (i.e., cumulatively) greater from one roll cluster to the next. For example, in a pull-though leveler incorporating this invention, as the strip moves between the work rolls of a given cluster, the strip speed will increase slightly between successive roll contacts, due to the strip being flexed beyond its yield point at each contact with the rolls and also due to the strip being under tension. Because the rolls in the cluster are geared together, the strip will drive the rolls so that the surface speed of the first roll in the cluster will tend to be slightly higher, and the surface speed of the last roll of the cluster slightly lower, than the average speed of the strip passing through that cluster; but, because there is no gearing between the clusters themselves, the roll speeds in other clusters will similarly accommodate to the strip speed in those clusters. The speed differential that occurs between rolls and strip in each cluster is sufficient to assure adequate self-cleaning of the rolls, but is not sufficient to cause marking of the strip surface or excessive wear of the rotating parts of the leveler due to roll and spindle "wind up."

With the work rolls arranged separately in geared clusters, as described above, it will be apparent that, as the strip progressively elongates during its progress through a pull-through leveler, it will drive the rolls of each cluster at a slightly faster rate than those of the immediately preceding cluster. Under certain circumstances, as explained more fully hereinafter, it may be desirable to connect the roll clusters together by drive means that include overrunning clutches, so that the rolls in a plurality of clusters may be driven at a predetermined minimum speed (for example, the speed of the first work roll at the entry side of the leveler), while at the same time permitting the rolls in each cluster to rotate faster than those in any preceding cluster when driven to do so by the strip itself. Each roll cluster may also include, in addition to at least two work rolls, intermediate or supporting rolls (in one or more banks) that do not come in contact with the strip.

Under other circumstances, as also explained more fully hereinafter, it may be desirable to interconnect the separate roll clusters by drive means that include differential gears, or a combination of such gears with overrunning clutch gears, in order to distribute the total applied torque among the separate roll clusters in a predetermined ratio that approximately corresponds to the torque required by each roll cluster to produce the adjacent deformation of the strip material passing through that cluster. This arrangement permits each cluster of rolls not only to contribute materially to moving the strip through the leveler, but also to rotate at a speed greater than the speed of the preceding cluster thereby avoiding undesired speed differentials between the work rolls and the strip.

In still other circumstances where the strip is pulled through the leveler under tension, the hereinafter described drive means may be used to transmit to the work rolls a load or resistance from a mechanical brake or from an electric generator connected to the main drive shaft. This additional loading can be used to provide some or all of the back tension on the strip that is normally provided by a bridle roll or payoff reel at the entry side of the leveler.

Figure 1:
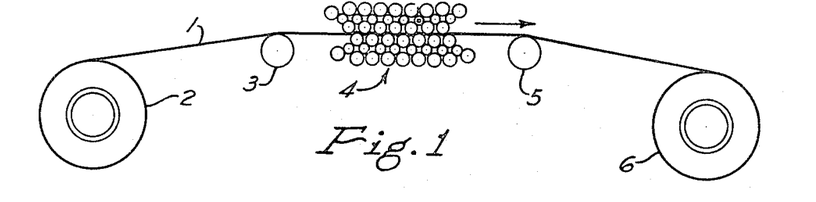
FIG. 1 is a diagrammatic view of a strip leveling line that includes a six-high roller leveler.

Referring to the drawings, FIG. 1 shows a strip leveling line, in which the strip material 1 is unwound from a payoff reel 2, then passes over an idler roll 3 into a six-high leveler 4, and then over a second idler roll 5 on to a take-up reel 6. Reels 2 and 6 are of conventional design, and the former may be provided with suitable braking means to adjust the back tension on the strip as it passes through the leveler. Take-up reel 6 is power driven by usual means (not shown) to provide adjustable forward tension on the strip. Idler rolls 3 and 5 serve as guide rolls to define a horizontal pass line for the strip as it is unwound from one reel and wound on the other.

Figure 2:
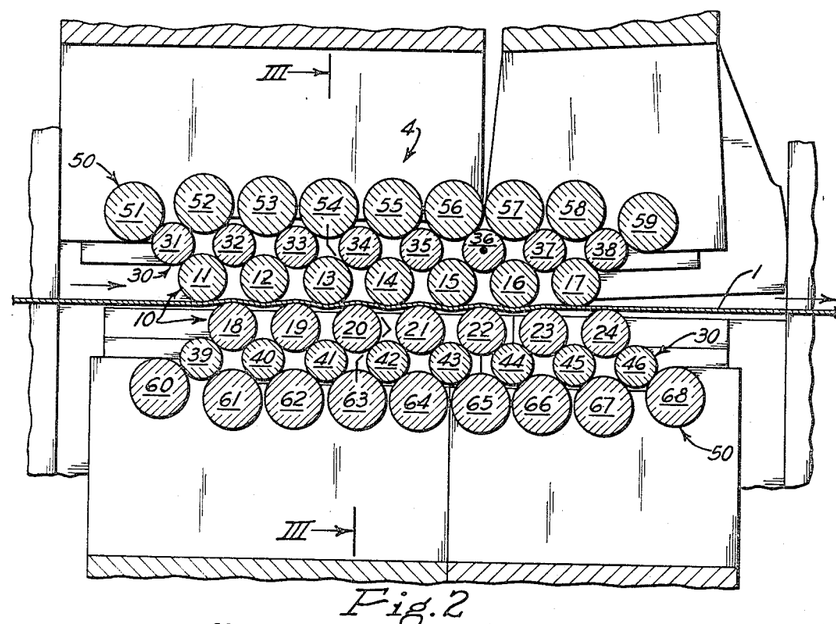
FIG. 2 is an enlarged fragmentary vertical section of the six-high roller leveler shown in FIG. 1.
Figure 3:
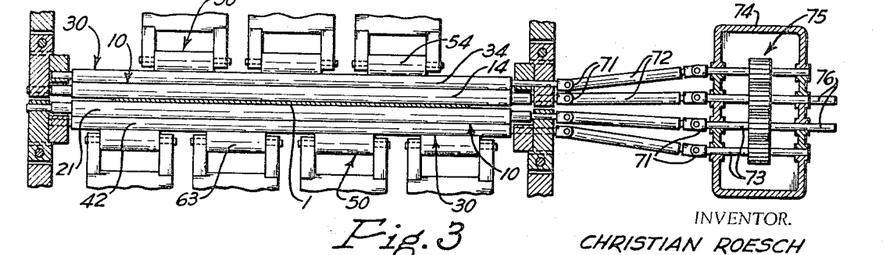
FIG. 3 is a fragmentary vertical exploded view, partly in section, from the entry side of a six-high roller leveler, along the line III—III of FIG. 2.

Leveler 4 is shown in more detail in FIGS. 2 and 3. It includes two banks of work rolls 10, the upper bank of such rolls being numbered consecutively from 11 through 17 from the entry to the exit side of the leveler, and the lower bank of such rolls being numbered consecutively from 18 through 24 in the same order. It will be noted that the work rolls in each bank are spaced from each other and are also spaced from and in staggered relation to the rolls in the other bank; but the tops of the lower bank of rolls may extend slightly above and between the bottoms of the upper bank of rolls, so that strip passing between the two banks will be flexed alternately in a series of transverse half-waves in passing over and under the successive work rolls. The strip is not, however, squeezed between opposed rolls as in a rolling mill.

The six-high leveler shown in FIGS. 2 and 3 is similar to the leveler described in detail in U.S. Patent No. 3,078,909, issued Feb. 26, 1963, to F. K. Maust, with the exception that the present leveler is limited to an exit tilt design rather than to a combined entry and exit tilt design as described in said patent. The work rolls 10 are backed by full length intermediate rolls 30, the upper bank of such rolls being numbered consecutively from 31 through 38 and the lower bank of such rolls from 39 through 46. Each of these intermediate rolls is mounted in staggered relation to the work rolls that they support and, except for the outer rolls in each bank, they rest between the adjacent work rolls. In addition, there are short-length, support rolls 50 backing up the intermediate rolls, the upper bank of these support rolls being numbered consecutively from 51 to 59 and the lower bank from 60 to 68. The mounting of the work rolls, intermediate rolls, and support rolls is substantially as described in the above patent, except that in the present embodiment the support rolls are idler rolls and not connected by gearing to the intermediate rolls.

The exit group of upper rolls, including work rolls 16 and 17, intermediate rolls 37 and 38, and support rolls 57, 58, and 59 form an exit tilt roll group, which can pivot slightly about the axis of intermediate roll 36, as more fully described in the above patent. This adjustable tilt permits a reduction in the amplitude of the transverse waves imparted to the strip at the exit side of the leveler.

Referring to FIG. 3, each work roll 10 and each intermediate roll 30, but none of the support rolls 50, is connected by universal joints 71, spindles 72, and shafts 73 to gears in a gear box 74. These gears are arranged to divide the work rolls, and also in this case the adjacent intermediate rolls, into predetermined clusters, so that the rolls in any given cluster will rotate in a fixed ratio to one another. Preferably, but not necessarily, that ratio should be one that will provide substantially identical surface speeds for the rolls in the cluster. For convenience, each gear is identified by the prime numeral of the roll with which it is associated.

Figures 4A, 4B, 4C, 10A, 10B, 10C:
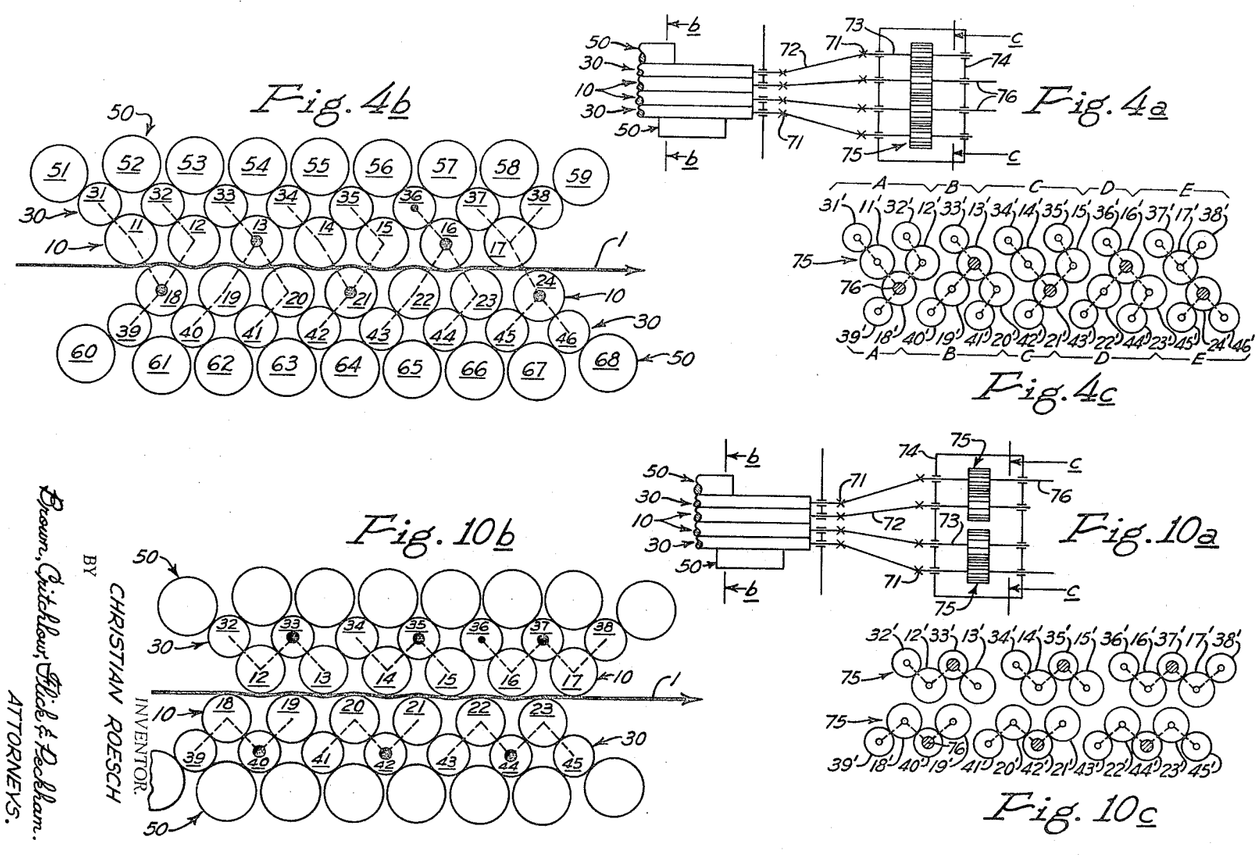

One arrangement of roll clusters for the leveler of FIGS. 2 and 3 is shown diagrammatically in FIGS. 4b and 4c, in which broken lines connect the rolls (and their associated gears) making up the separate clusters. Here the work rolls are divided into five clusters, each cluster including at least two work rolls and at least three intermediate rolls. Beginning at the entry side of the leveler, these clusters are designated by capital letters, as follows: cluster A, consisting of work rolls 11, 12, and 18, and intermediate rolls 31, 32, and 39; cluster B, consisting of work rolls 13, 19, and 20, an intermediate rolls 33, 40, and 41; cluster C, consisting of work rolls 14, 15, and 21, and intermediate rolls 34, 35, and 42; cluster D, consisting of work rolls 16, 22, and 23, and intermediate rolls 36, 43, and 44; and cluster E, consisting of work rolls 17 and 24, and intermediate rolls 37, 38, 45, and 46. One gear in each cluster is shown with a sectioned center (and the corresponding roll is shown with an enlarged center) to indicate that a stub shaft 76 extends from the gear through the side of the gear box for manually or otherwise turning the rolls of the cluster, as explained later herein.

The leveler shown in FIGS. 4a, 4b, and 4c is assumed to be part of a strip leveling line of the type shown in FIG. 1, and it is further assumed that it is a pull-through leveler, in which all of the power applied to the rolls is applied in the form of tension on the strip. After the strip has been threaded through the machine and fully engages the rolls so as to turn them by frictionally applied torque, the strip is repeatedly flexed beyond its elastic limit as it passes under and over the work rolls. The strip elongates slightly with each flexure, and more so when it is under substantial tension. As the strip elongates, its speed through the leveler increases in proportion. In passing through cluster A, it undergoes progressive elongation (and its speed progressively increases) as it successively contacts work rolls 11, 18, and 12; but, because these work rolls are geared together so as to turn with the same surface speed, there will be some slippage between the strip and the work rolls in the cluster. The tendency will be for the strip to drive all the work rolls of the cluster at the average speed of the strip, so that the strip will be moving slightly slower than entry roll 11 and slightly faster than exit roll 12. The intermediate rolls in cluster A are also geared to the work rolls. In this connection, it should be noted that the intermediate rolls are of different diameter (here smaller) than the work rolls, so as to avoid having the same portions of the intermediate rolls always contacting the same portions of the adjacent work rolls on each revolution, which would tend to mark the work roll. Accordingly, the gearing between the work and intermediate rolls is so arranged as to provide substantially identical surface speeds for both intermediate and work rolls, so that there will be no slippage between the intermediate and work rolls in any given cluster. For example, intermediate roll 32, which is geared to work roll 12, will revolve in the appropriate direction (counterclockwise) and at the proper speed to avoid slippage between its surface and the surfaces of both work rolls 11 and 12 (revolving clockwise) with which it is in contact.

As the strip moves between cluster A and cluster B, it undergoes further minute elongation, and it continues to elongate slightly in the passing through cluster B. These further elongations and resulting increases in strip speed, are compensated for as previously described, i.e., by the strip tending to drive the work rolls of cluster B at a speed approaching the average speed of the strip through that cluster. The speed of both strip and rolls in cluster B will be slightly higher than the corresponding speeds in cluster A. Because the rolls of the two clusters are not geared together, they can make this speed adjustment. Again, the intermediate rolls 30 that are geared into this cluster will revolve at the same surface speed as the work rolls 10. There will be some slippage, however, between intermediate rolls 33 and 40 (which are part of cluster B), on the one hand, and work rolls 12 and 18 (which are part of cluster A), on the other hand. This slippage is very slight and not sufficient to cause marring of the work rolls and consequent marking of the strip. Similarly, there will be a very slight slippage between those support rolls 50 that contact two adjacent intermediate rolls in different clusters. Support rolls 50 are idler rolls and are driven solely by frictional engagement of their surfaces with the surface of one or more adjacent intermediate rolls. Where a support roll touches only one or two intermediate rolls in the same cluster (as, for example, upper support rolls 51 and 52 in FIG. 4b), the support rolls will rotate in the appropriate direction and at the proper surface speed to avoid slippage with such intermediate rolls (as, for example, rolls 31 and 32 in FIG. 4b). The next adjacent support roll 53, however, contacts both intermediate rolls 32 and 33, the former being part of cluster A and the latter part of cluster B. Because intermediate rolls 32 and 33 are turning at slightly different speeds, they will tend to drive the support roll at their average speed. The resulting slippage tends to be divided and is, in any event, so small that it will not mar the intermediate rolls to cause marking of the strip. It should be noted that slippage (1) between a work roll in one cluster and an intermediate roll in a different cluster, or (2) between a support roll and two adjacent intermediate rolls in different clusters, involves only line contact between roll surfaces. On the other hand, slippage between the strip and a work roll, about which the strip is flexed, involves area contact and much higher total frictional forces.

As the strip moves through successive clusters towards the exit side of the leveler, it undergoes further progressive elongations with the same results that are noted above. It is a feature of this invention, however, that the differential speed between strip and work rolls does not progressively and cumulatively increase towards the exit side of the leveler, the increase being only within the limits of each roll cluster. This result is obtained because the clusters are not geared together and their only mutual interaction is from the slight frictional engagement (1) between some of the intermediate rolls of one cluster and some of the work rolls of an adjacent cluster and (2) between some of the support rolls that are in contact with intermediate rolls in separate clusters. Accordingly, the absolute speed of the work rolls in any given cluster will depend not only on the speed of the strip passing through the cluster, but also on other factors that include roll friction, the surface condition of the strip, and what may be termed "roll influence" (i.e., the interaction between the rolls of different clusters referred to in the preceding sentence.)

When the leveler is provided with a tilting group of rolls at the exit side, as in the apparatus described herein, the strip may make only minimal contact with exit work rolls 17 and 24, which are the work rolls of cluster E in FIG. 4b. Under some circumstances, there may not be enough frictional engagement between those rolls and the strip to drive the rolls at approximately the same speed as the strip, even with the help of the frictional engagement between intermediate rolls 37 and 45 of cluster E and work rolls 16 and 23, respectively, of cluster D (or between support roll 57 and intermediate rolls 36 and 37, or support roll 66 and intermediate rolls 44 and 45). Under such circumstances, there may be sufficient slippages between the strip and the exit work rolls of the last cluster to cause marking of the strip, particularly with thin gauges having a mirror finish. Under those conditions, it is desirable to use the arrangement shown in FIGS. 5, 6 and 11, which includes supplemental gearing and overrunning clutch means between adjacent clusters to assure (1) that the rolls in all clusters will rotate at some predetermined minimum speed and (2) that the rolls in each cluster can turn at a faster speed than the rolls in the preceding cluster to accommodate progressive increases in strip speed. A power drive may also be introduced to overcome friction. Such an arrangement is shown in FIG. 5.

Figure 5:
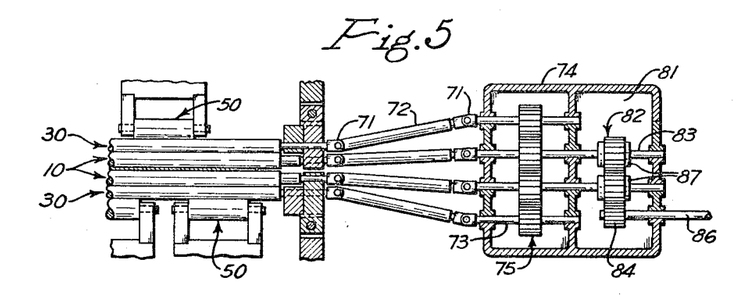
FIG. 5 is a fragmentary vertical exploded view, partly in section, from the entry side of a six-high roller leveler similar to FIG. 3, but including additional gearing provided with overrunning clutches.
Figure 11:
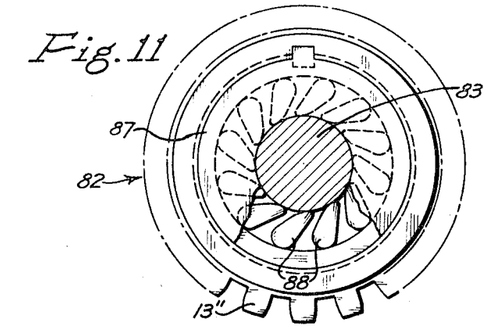
FIG. 11 shows diagrammatically some of the details of one of the overrunning clutch gears that is connected to an upper work roll in FIGS. 5, 6a, and 6c.

FIG. 5 is similar to FIG. 3, except that the gear box has been extended to provide a supplemental compartment 81, which includes overrunning clutch gears 82 mounted on shafts 83. These shafts connect the "clutch-gears" 82 to certain of the main gears 75, specifically the same gears to which stub shafts 76 are connected in FIGS. 4a and 4c. A drive gear 84, mounted on the shaft 86, is turned by a suitable motor (not shown) to overcome friction and other sources of energy loss in the apparatus. It will be apparent from FIGS. 6b and 6c that the main gearing arrangements within each roll cluster are the same as that shown in FIGS. 4b and 4c. FIG. 6c also shows diagrammatically the general arrangement of the drive gear 84 and th eoverrunning clutch gears 82 (the latter being further identified by the double prime of the numeral of th eroll with which it is directly associated). FIG. 11 shows details of one form of a conventional overrunning clutch gear, in which the gear can drive shaft 83 in a counterclockwise direction (looking at FIG. 11) through the overrunning clutch element 87 with its sprags 88. (Hence, this clutch gear is suitable for connection to the upper work rolls 13 or 16 of FIG. 6b, which rotate in a counterclockwise direction. The clutch gears attached to the lower work rolls would have their sprags inclined in the opposite direction.) The shaft 83 can rotate in the same direction, however, at a higher speed than the gear. In other words, the shaft may overrun the gear in the direction that the gear drives the shaft. The clutch illustrated in FIG. 11 is a conventional cam clutch, similar to those made by the Morse Division of Bork-Warner Corporation, but it will be readily apparent that other types of conventional overrunning clutches can also be used.

Figure 6A:
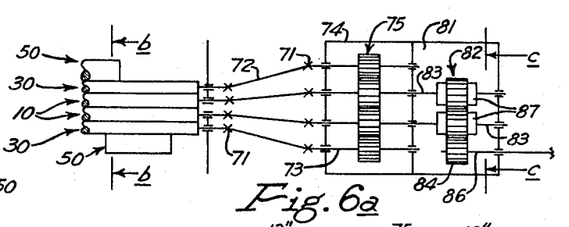
FIG. 6a is a partial vertical exploded view.
Figure 6B:
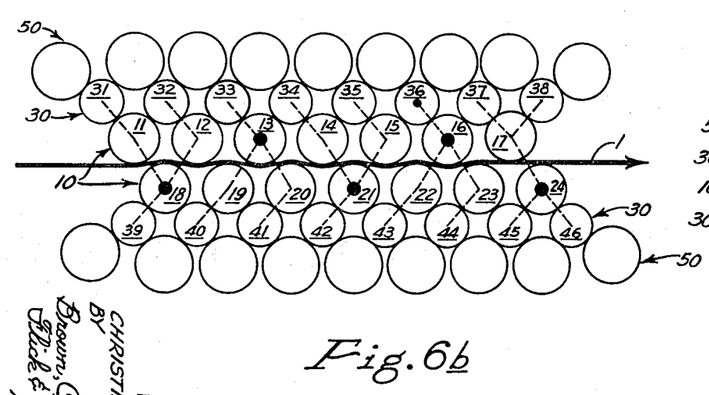
Figure 6C:
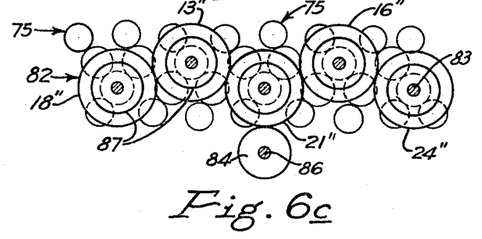

The operation of the leveler shown in FIGS. 5 and 6 is generally similar to that described in connection with FIGS. 3 and 4. The important contribution of the overrunning clutch gearing is to permit all of the work rolls to be driven at some minimum predetermined speed and yet permit the work rolls in successive clusters towards the exit side of the leveler to turn at a higher speed than the work rolls of the preceding cluster. As a result, when the exit group of rolls is tilted upward to provide only a light engagement between the strip and the work rolls of the exit cluster, those rolls will still turn at least as fast as the minimum speed imposed b yth overrunning clutch gear arrangement. As a result, slippage between the exit work rolls and the strip (in the absence of sufficient friction to drive the work rolls at the average speed of the strip) will be reduced to an amount that will enirely eliminate or substantially reduce the chances of making the strip.

Figures 7A, 7B, 7C, 8A, 8B, 8C, 9A, 9B, 9C:
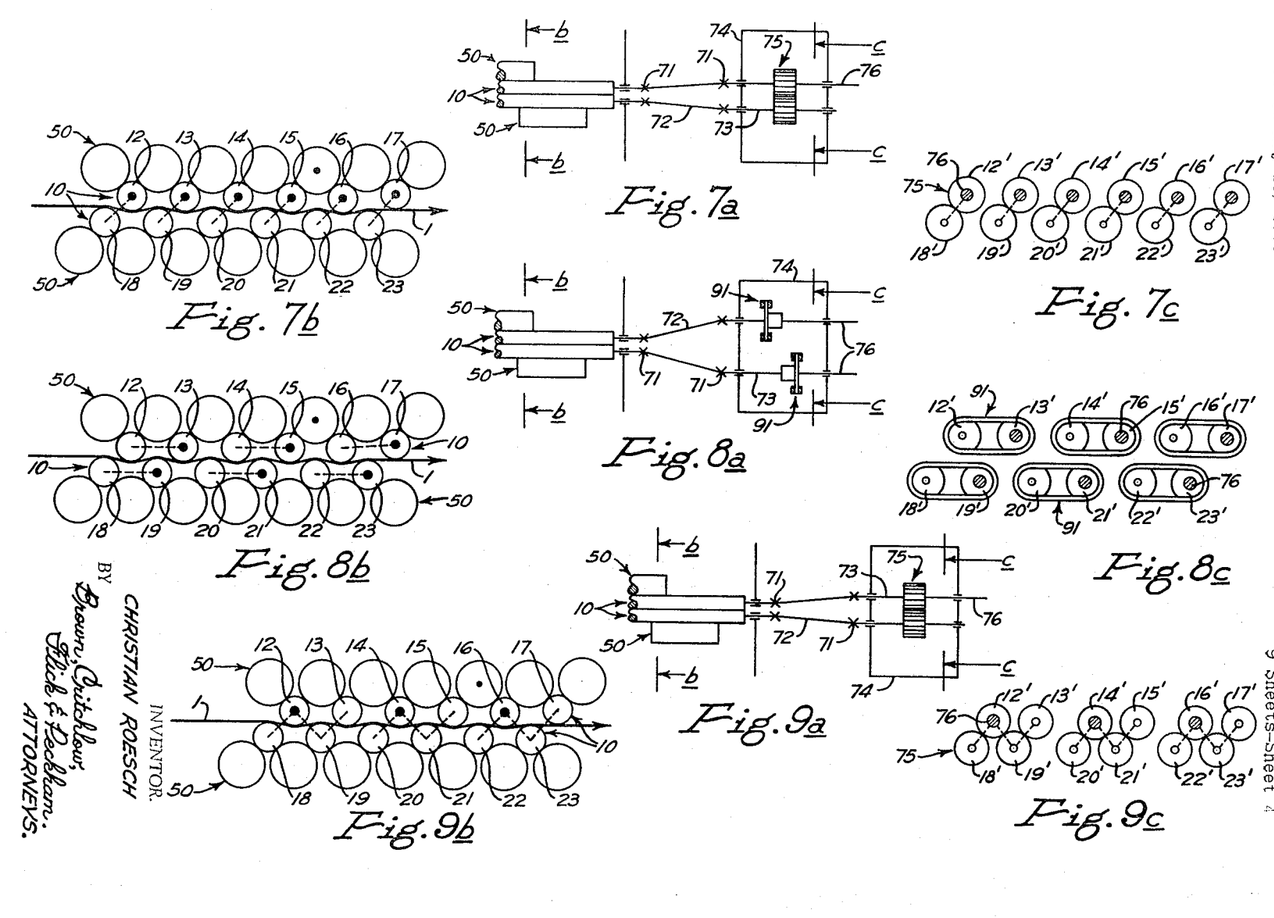

In FIGS. 7a, 7b, and 7c, there is shown a four-high, pull-through leveler with twelve work rolls (numbered 12 through 23) and an appropriate number of support rolls 50, but no intermediate rolls 30. Here the work rolls are divide into six clusters, each consisting of one upper and one lower work roll, which are geared together as shown through spindles and gear box. With four-high levelers, however, there is often room enough to provide the desired gears directly to the ends of the rolls, eliminating the need for any spindles. The strip in passing through each cluster elongates slightly, with a corresponding increase in its speed, and will tend to drive the work rolls of each cluster at the average speed of the strip through the cluster, with the rolls in successive clusters moving slightly faster than those in the preceding cluster. In addition, where a support roll 50 contacts more than one work roll, there will be some slippage between it and one or both of the work rolls, but the slippage will be insufficient to cause marring of the work rolls and consequent marking of the strip.

In FIGS. 8a, 8b, and 8c, a similar four-high, pull-through leveler is shown, in which each work roll cluster consists of two horizontally adjacent work rolls. In this case, the work rolls in any given cluster must revolve in the same direction, so they are connected by a chain and sprocket drive 91, rather than by gearing (although the same effect could be obtained by using an idler gear). The first work roll cluster includes rolls 18 and 19, and it is overlapped on the opposite side of the strip by the second cluster consisting of rolls 11 and 12. For the reasons previously stated, as the strip passes through successive clusters, it will tend to drive the rolls in any one cluster at the average speed of the strip within that cluster, the rolls in each successive cluster turning slightly faster than those in the preceding cluster. The net result is that there will be some slippage between the strip and each of the work rolls.

In FIGS. 9a, 9b, and 9c is shown a still further modification of the cluster arrangement in a four-high, pull-through leveler, in which each cluster consists of four work rolls (two on one side and two on the other side of the strip) geared together as shown in FIG. 9c. Because of the inclusion of more work rolls in a single cluster, there will tend to be a greater speed differential and consequently greater slippage between the strip and at least some of the rolls within each cluster. The tendency will be for those rolls to revolve at the average speed of the strip, so that the greatest slippage will occur between the strip and the first and last rolls of the cluster.

In FIGS. 10a, 10b, and 10c, there is shown a six-high, pull-through leveler similar to that shown in FIG. 4; but here the work and intermediate rolls have been connected into a modified cluster arrangement, in which each cluster is limited to rolls in the same bank. In this respect, the clusters are similar to those shown in FIG. 8; but, because of the presence of intermediate rolls, they can be geared directly to each other, as shown in FIG. 10c. In both FIGS. 8 and 10, one roll cluster overlaps another on opposite sides of the strip, the rolls of different clusters being free to move at the speed determined by the strip with which they are in contact.

In all of the various modifications listed above, there occurs sufficient slippage between each work roll and the strip in contact with it to assure adequate self-cleaning of the rolls, but not sufficient slippage to cause marking of the strip surface. It may, however, be necessary or desirable to clean the work rolls more thoroughly at infrequent intervals. This is ordinarily done by holding a felt pad between the work rolls and turning the rolls so that they slip against the felt. In levelers of the type shown in FIG. 6, which are motor driven, there is no difficulty in turning the rolls at the appropriate speed for cleaning. In the pull-through leveler, however, other means must be used to turn the rolls. These are provided by the stub shafts 76 extending from one work roll in each cluster. The outer end of each stub shaft is adapted to receive suitable means for turning the shaft so as to cause all of the rolls in the cluster to turn also.

It will be apparent that the supplemental gearing provided with overrunning clutches that was described in connection with FIGS. 5 and 6 can also be used with the six-high leveler of FIG. 10 and with any of the four-high levelers of FIGS. 7, 8, and 9. Such use is indicated whenever it is desired to have all the work rolls rotate at some minimum surface speed under conditions where there may be insufficient friction between strip and rolls, as at the exit side of the leveler, for the strip to drive the rolls of one cluster at least as fast as that minimum speed. In addition, motor drive means can be used with such supplemental gearing to overcome frictional and other losses in the system. Of course, other cluster arrangements of work rolls, or of work rolls and backing rolls, can be devised in addition to those illustrated herein as examples of the present invention.

It will also be apparent that, in place of the supplemental gearing provided with overrunning clutches, each cluster can be driven by separate drive means (connected, for example, to stub shafts 76 in FIGS. 4a and 4c), not only to overcome friction but also to supply some or all of the power required to level the strip in passing it through the leveler. In addition, such drive means can maintain the surface speed of the work rolls in each cluster at some predetermined minimum speed, which may approximate the average speed of the strip passing through that cluster.

Figure 12:
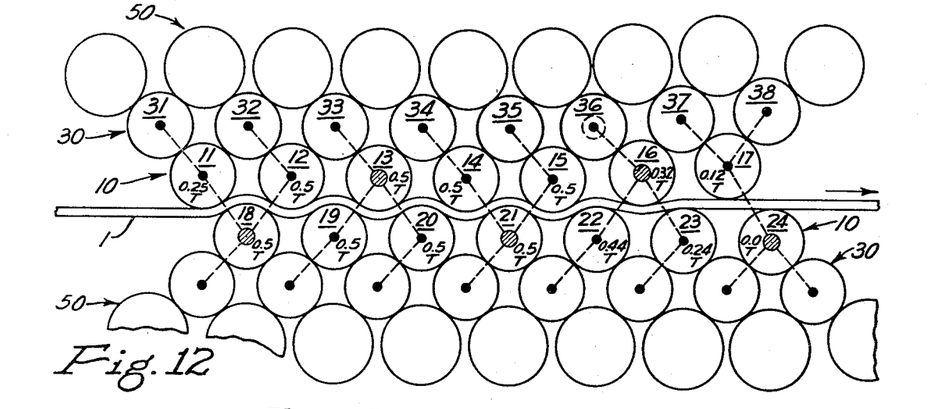
FIG. 12 is a diagrammatic vertical section of a six-high, exit-tilt leveler like that shown in FIG. 4b, in which each work roll is labeled with a torque value approximately corresponding to that required to produce the adjacent deformation in the strip material passing through the leveler.

Referring to FIG. 12, the leveler there illustrated is similar in its general structure to that shown in FIG. 4b, and the rolls are likewise arranged in five clusters and are similarly numbered. This leveler is of the exit-tilt type, which permits the upper bank of exit rolls to tilt as a unit about the axis of intermediate roll 36. In such a leveler, the strip is subjected, except at the exit end, to substantially uniform bending in the form of alternate half waves of the same amplitude extending transversely of the strip. At the exit end, however, the amplitude of the half waves is progressively reduced by the tilting of the upper rolls. Observation has shown that the torque required by the work rolls to move the strip through the leveler varies with the amount of deformation imparted to the strip, that the torque required by each work roll varies with the amplitude of the half wave (or partial half wave) produced by that roll in the adjacent strip, and that the relative torque distribution (although not its absolute value) among the various work rolls is independent of the tension applied to the strip at the delivery end of the leveler.

In FIG. 12, each of the work rolls has been labeled with an arbitrary torque value that indicates the approximate torque required by that roll (relative to an arbitrary total torque requirement for all the work rolls) to produce the indicated deformation in the strip passing through the leveler. Although the relative torque values assigned to the work rolls in FIG. 12 are merely exemplary, they are believed to be typical of a leveler of the type described. The maximum torque required to produce a full half-wave of the greatest amplitude shown has been arbitrarily assigned a value of 0.5T. In an exit-tilt leveler, full half waves are produced by most of the rolls, and they are substantially uniform. Accordingly, most of the rolls have been assigned this torque value of 0.5T, the exceptions being the first work roll 11 at the entry end of the leveler and the five work rolls 16, 17, 22, 23, and 24, at the exit end. Roll 11 produces only a partial half-wave deformation in the adjacent strip, the deformation occurring on only one side of the roll; it has therefore been assigned a torque value of 0.25T. The above-enumerated work rolls at the exit end of the leveler produce progressively less deformation in the adjacent strip because of the tilt of the upper rolls, and these rolls have therefore been assigned progressively smaller torque values varying from 0.44T for roll 22 to 0.0T for roll 24.

It is an object of the present invention to apply to each roll cluster its assigned torque requirements through drive shafts 76a, 76b, etc., which are connected respectively to gears 75a, 75b, etc. (The work rolls corresponding to these gears are work rolls 13, 16, 18, 21, and 24, as shown by their enlarged sectioned centers in FIG. 12).

For example, the total torque requirement for the first roll cluster at the entry end of the leveler, which includes work rolls 11, 12, and 18 and intermediate rolls 31, 32, and 39 (all of which are geared together as shown in FIG. 4c), is the sum of the torques assigned to the work rolls, or 1.25T. Similarly, the total torque for each of the second and third clusters is 1.5T, that for fourth cluster is 1.0T, and that for the fifth cluster is 0.12T. The total torque for all rolls is therefore 5.37T, which for convenience may be reduced to 5.25T by ignoring the torque requirement (0.12T) of the last roll cluster. In addition, the rolls of each cluster must at the same time be permitted to rotate at a slightly higher surface speed than those of the preceding cluster to accommodate the slight increase in speed of the strip due to its elongation as it moves through the leveler.

Figure 13:
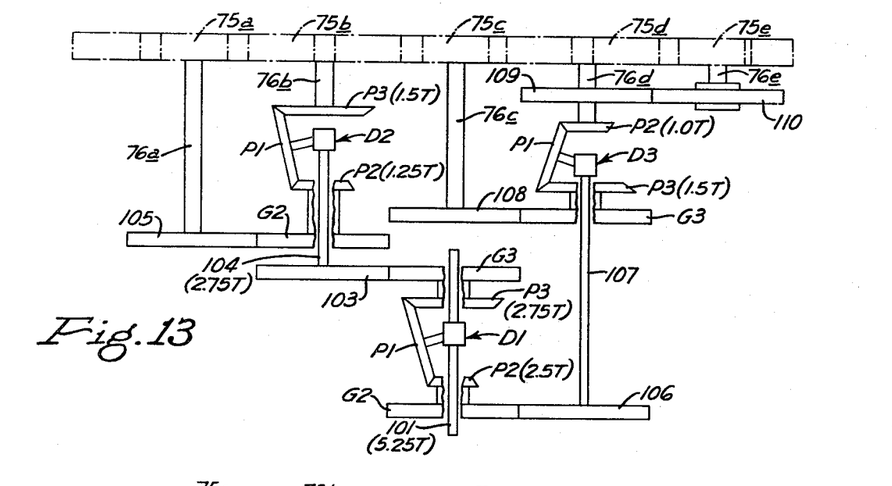
FIG. 13 is a diagrammatic plan view of a suitable drive arrangement for the leveler shown in FIG. 12, in which the gearing for the five separate roll clusters may be connected to a power source or brake through a combination of regular, differential, and overrunning clutch gears.
Figure 25:
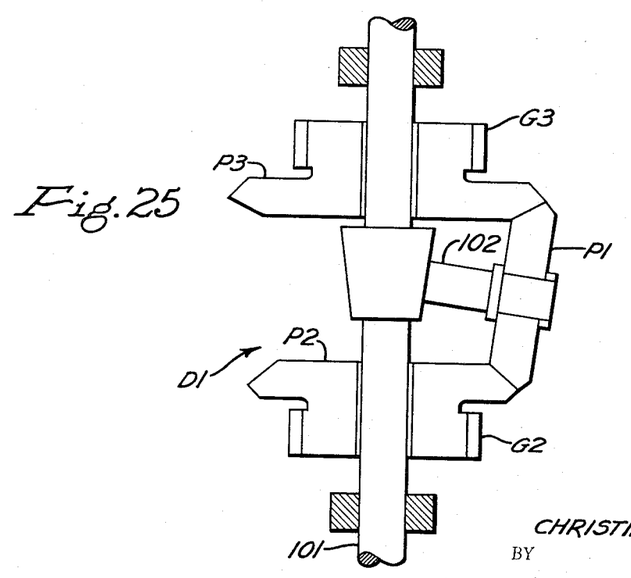
FIG. 25 is a similar view of a modified differential gear of the type shown in FIGS. 13-14, 16-17, and 19-20, for providing unequal output torques.

A suitable drive arrangement that will satisfy the above conditions for the leveler of FIG. 12 is shown in FIG. 13. In the latter figure, the drive shaft 76 of each roll cluster is connected to a power source (not shown) through a combination of regular, differential, and overrunning clutch gears. The total torque input is assumed to be 5.25T, which, as stated above, ignores the minimal torque requirement (0.12T) of the last roll cluster at the exit end of the leveler. This total torque input is delivered to the input shaft 101 of an unequal torque differential D1, which is shown more representationally in FIG. 25. It includes the following parts: input shaft 101; differential pinion $P_1$, which is rotatably mounted on a shaft 102 that is rigidly connected at an oblique angle to input shaft 101; output pinions P2 and P3 of unequal diameters; and output gears G2 and G3, which are integral with the output pinions. From the geometry of this unequal torque differential and from the laws governing differential gears, it will be apparent that a given input torque will be divided into two unequal output torques, the latter having the same ratio to each other as the diameters of their associated output pinions P2 and P3. For the unequal torque differential shown in FIG. 25 and the similar differentials (shown more diagrammatically) in FIGS. 13 and subsequent figures, the larger output torque is delivered by the output pinion having the larger diameter, which is designated in all of the figures as P3. It also follows from the laws governing differential gears that the angular velocities of output pinions P2 and P3 may differ without affecting the ratio of their output torques, while at the same time maintaining the ratio of the speed difference between the differential input shaft and the output pinions P2 and P3. When the angular velocities of each of the output pinions is the same, differential pinion P1 will not rotate about its own axis. However, when conditions in the leveler so dictate, one of the output pinions can rotate faster than the other, in which case differential pinion P1 will rotate about its own axis as it is turned bodily about the axis of input shaft 101.

Referring again to FIG. 13, the input torque of 5.25T is divided by differential D1 into output torques of 2.5T and 2.75T by providing this same ratio between the diameters of the output pinions P2 and P3, respectively. The larger output torque is transmitted through gear G3 and a spur gear 103 to the input shaft 104 of a second unequal differential D2. The output of the second differential is divided into torques of 1.25T and 1.5T, the former being transmitted through output gear G2 and spur gear 105 to drive shaft 76a of the first roll cluster at the entry end of the leveler. The transmitted torque of 1.25T is equal to the total torque assigned to the first roll cluster in FIG. 12. Similarly, the output torque of 1.5T from differential D2 is transmitted from output pinion P3 directly to drive shaft 76b of the second roll cluster. The smaller torque output of differential D1, amounting to 2.5T, is transmitted through output gear G2 and spur gear 106 to the input shaft 107 of a third unequal differential D3, where it is subdivided into output torques of 1.0T and 1.5T. The larger of these subdivided torques is transmitted through output gear G3 and spur gear 108 to drive shaft 76c of the third roll cluster. The smaller of the output torques of differential D3 is transmitted through the shaft of output pinion P2 to drive shaft 76d of the fourth roll cluster. On the shaft of this same output pinion P2 is mounted a spur gear 109 that meshes with an overrunning clutch gear 110, which is similar to the overrunning clutch gears 82 of FIGS. 5 and 11. Gear 110 drives shaft 76e of the fifth and last roll cluster of the leveler shown in FIG. 12.

As a result of the above arrangement, the total input torque of 5.25T is subdivided and distributed among the five roll clusters of the leveler approximately in accordance with the torque requirements of those clusters, while at the same time the rolls of each cluster are permitted by the differential and overrunning clutch gears to maintain a slight surface speed differential relative to the rolls of an adjacent cluster. In addition, a minimum torque is applied to the last roll cluster for driving the rolls therein at least as fast as the rolls in the immediately preceding cluster.

Figure 14:
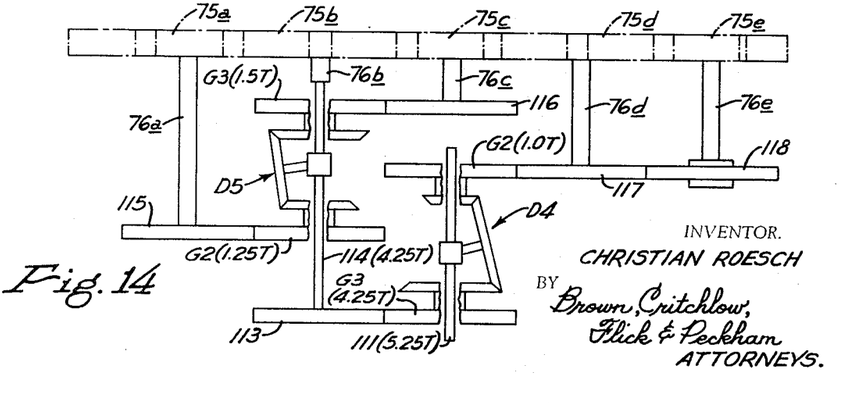
FIG. 14 is a similar view of a modified drive arrangement for the leveler of FIG. 12.

In FIG. 14, the same torque requirements of the leveler in FIG. 12 are satisfied through a slightly different arrangement of gearing. An input torque of 5.25T is delivered to the input shaft 111 of an unequal torque differential D4, wherein it is divided into output torques of 1.0T and 4.25T. The latter is delivered through output gear G3 and spur gear 113 to input shaft 114 of another unequal torque differential D5 and is therein divided into torque outputs of 1.25T and 1.5T. In addition, an extension of input shaft 114 through the differential transmits a torque of 1.5T directly to drive shaft 76b of the second roll cluster. The smaller (1.25T) of the torque outputs of differential D5 is transmitted through output gear G2 and spur gear 115 to drive shaft 76a of the first roll cluster. Drive shaft 76c of the third roll cluster is connected through a spur gear 116 to output gear G3 of differential D5. Returning to differential D4, the smaller of its torque outputs 1.0T is transmitted through output gear G2 and spur gear 117 to drive shaft 76d of the fourth roll cluster. Spur gear 117 also drives overrunning clutch gear 118, which in turn, as previously explained in connection with overrunning clutch gear 109 in FIG. 13, is connected to drive shaft 76e of the fifth and last roll cluster.

Figure 15:
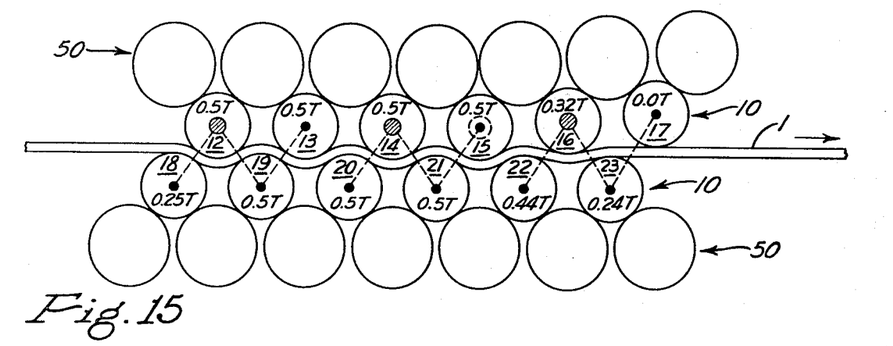
FIG. 15 is a diagrammatic vertical section of a four-high, exit-tilt leveler like that shown in FIG. 9b, in which each work roll is labeled with a torque value approximately corresponding to that required to produce the adjacent deformation in the strip material passing through the leveler.

In FIG. 15 is shown a diagrammatic vertical end section of the rolls in a four-high, exit-tilt leveler of the general type shown in FIG. 9b, having twelve work rolls that are grouped into three roll clusters of four work rolls each. Torque values have been assigned to each work roll as indicated, on the same basis as previously described in connection with FIG. 12, for a total torque requirement of 4.75T. Two exemplary arrangements for distributing the required torque input among the three roll clusters are shown in FIGS. 16 and 17.

Figure 16:
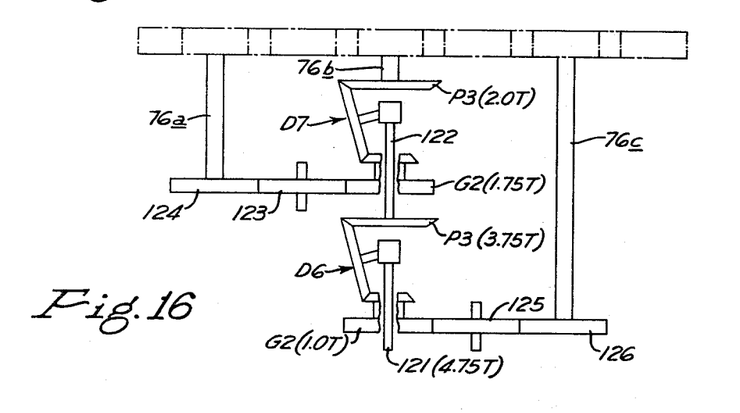
FIG. 16 is a diagrammatic plan view of a suitable drive arrangement for the leveler shown in FIG. 15, in which the gearing for the three separate roll clusters may be connected to a power source or brake through a combination of regular and differential gears.

In FIG. 16, a torque of 4.75T is delivered to input shaft 121 of an unequal torque differential D6 and therein divided into output torques of 1.0T and 3.75T. The larger of those outputs is transmitted through output pinion P3 to an input shaft 122 of another unequal torque differential D7. The input to the latter is subdivided into output torques of 1.75T and 2.0T. The smaller of these subdivided torque outputs is transmitted through output gear G2, idler gear 123 (to obtain the proper direction of rotation of the driven rolls), and spur gear 124 to drive shaft 76a of the first roll cluster. The larger output from differential D7 is transmitted through output pinion P3 to drive shaft 76b of the second roll cluster. The third roll cluster has its drive shaft 76c connected to the smaller of the torque outputs of differential D6 through gear G2 of that differential, idler gear 125, and spur gear 126.

Figure 17:
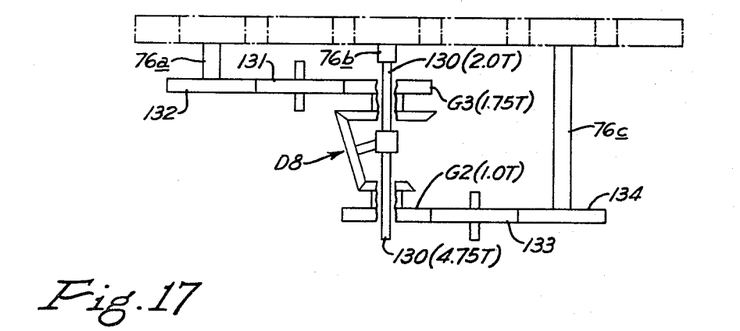
FIG. 17 is a similar view of a modified drive arrangement for the leveler of FIG. 15.

An alternate arrangement for satisfying the torque requirements of the leveler of FIG. 15 is shown in FIG. 17. Here the input torque delivered to input shaft 130 is divided in unequal torque differential D8 into three outputs. One of those outputs of 2.0T is transmitted directly from the input shaft 30 to drive shaft 76b of the middle roll cluster. Another output torque of 1.75T is connected through output gear G3 of differential D8, idler gear 131, and spur gear 132 to drive shaft 76a of the first roll cluster. The third and smallest output torque of differential D8 is connected through its output gear G2, idler gear 133, and spur gear 134 to drive shaft 76c of the third roll cluster.

Figure 18:
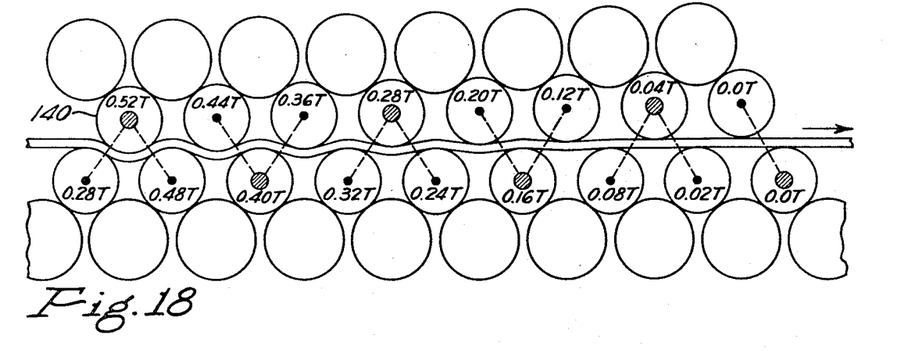
FIG. 18 is a diagrammatic vertical section of a four-high, single-tilt leveler that is generally similar to the leveler shown in FIG. 9b, but has a larger number of work rolls and backing rolls, which are arranged in six clusters with the upper bank of rolls tiltable as a unit about an axis parallel to the upper work rolls, each of the work rolls being labeled with a torque value approximately corresponding to that required to produce the adjacent deformation in the strip material passing through the leveler.

In FIG. 18 is shown a vertical section of the ends of the rolls of a four-high leveler having seventeen work rolls 140 arranged in six clusters of three rolls each, except for the last cluster which has only two rolls. The leveler is a single-tilt leveler, in which the entire upper bank of rolls is movable as a unit towards and away from the lower bank and is also tiltable as a unit about an axis parallel to the upper work rolls. As a result, the deformation waves imparted to the strip passing through such a leveler are characterized by progressively decreasing amplitude from the entry to the exit end. Accordingly, the full wave torque requirements of the work rolls progressively decrease in the same direction; and that fact is reflected in the torque value assigned to each of the work rolls, as noted in the drawing.

Figure 19:
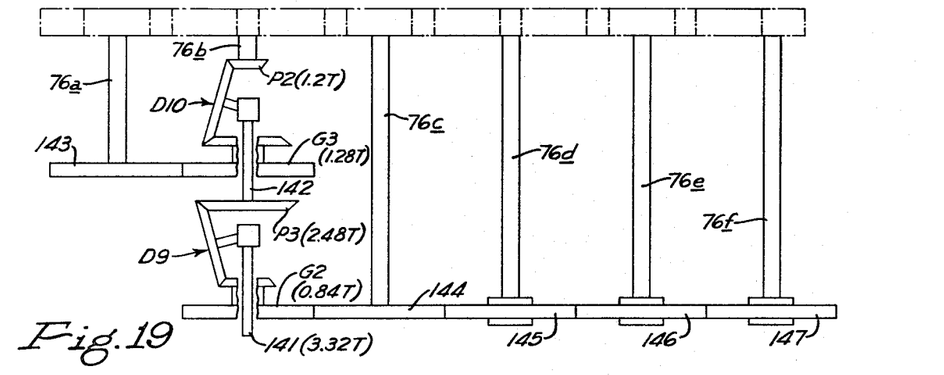
FIG. 19 is a diagrammatic plan view of a suitable drive arrangement for the leveler of FIG. 18, in which the drive shafts of the gearing for the six separate roll clusters may be connected to a power source or brake through a combination of regular, differential, and overrunning clutch gears.
Figure 20:
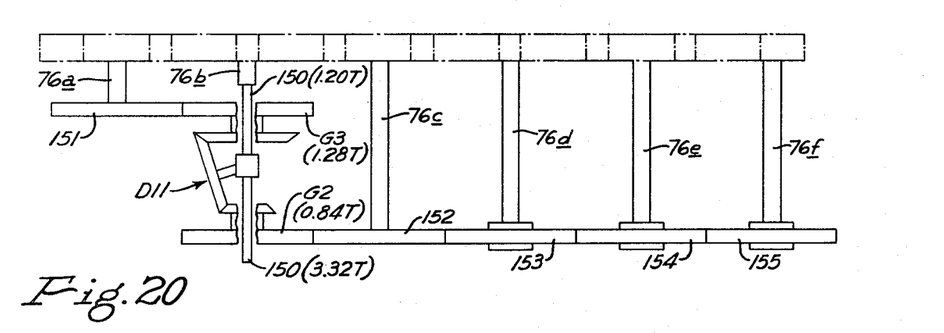
FIG. 20 is a similar view of a modified drive arrangement for the leveler of FIG. 18.

FIGS. 19 and 20 show two different arrangements for distributing a total torque input of 3.32T to the six clusters of the leveler shown in FIG. 18, in accordance with the assigned torque requirements of each cluster. In each arrangement, three clusters are power driven and three have idling drives using over-running clutches.

In FIG. 19, the total input torque of 3.32T is delivered to the input shaft 141 of an unequal torque differential D9 and is divided therein into output torques of 0.84T and 2.48T. The larger of these outputs is transmitted through output pinion P3 to the input shaft 142 of another unequal torque differential D10 and subdivided therein into output torques of 1.2T and 1.28T. The larger of these outputs is transmitted through output gear G3 of differential D10 and spur gear 143 to drive shaft 76a of the first roll cluster. The smaller of the output torques of differential D10 is transmitted through pinion P2 to drive shaft 76b of the second roll cluster. The drive shaft 76c of the third roll cluster receives its torque through spur gear 144 from the smaller output gear G2 of differential D9. This same spur gear 144 also drives three overrunning clutch gears 145, 146, and 147, which are in turn connected respectively to drive shafts 76d, e, and f of the fourth, fifth, and sixth roll clusters.

In the arrangement shown in FIG. 20, the input torque of 3.32T is delivered to the input shaft 150 of an unequal torque differential D11 and is subdivided therein into three output torques. The largest of 1.28T is delivered through output gear G3 and spur gear 151 to drive shaft 76a of the first roll cluster. An output of 1.20T is delivered through an extension of the input shaft 150 to drive shaft 76b of the second roll cluster. The third output of 0.84T is delivered through output gear G2 and spur gear 152 to drive shaft 76c of the third roll cluster and also through three overrunning clutch gears 153, 154, and 155 to drive shafts 76d, e, and f of the fourth, fifth, and sixth roll clusters, respectively.

Figure 21:
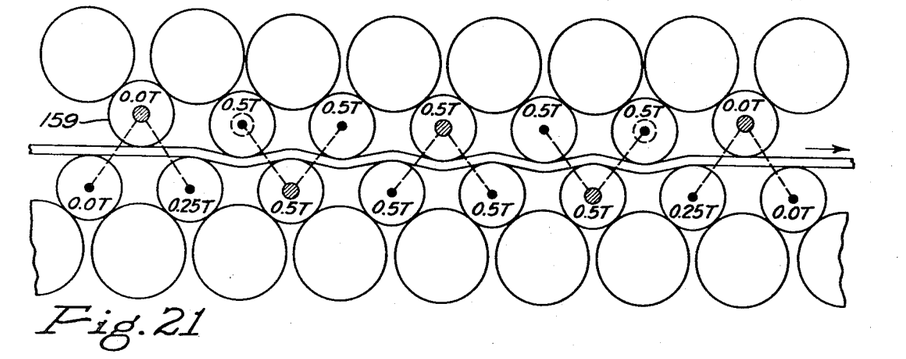
FIG. 21 is a diagrammatic vertical section of a four-high, double-tilt leveler that is generally similar to the leveler shown in FIG. 9b but has a larger number of work rolls and backing rolls, which are arranged in six clusters with the upper banks of rolls tiltable about the axes of the upper work rolls near each end of the leveler, each work roll being labeled with a torque value approximately corresponding to that required to produce the adjacent deformation in the strip material passing through the leveler.

In FIG. 21 is shown a four-high leveler having fifteen work rolls 159 divided into five clusters of three rolls each. This leveler is of the double-tilt type in which the upper work rolls and backing rolls at each end of the leveler are tiltable about the axis of the second upper work roll from that end. Levelers of this type are described in detail in Maust Patent No. 2,945,530, and in other patents cited therein. It is a characteristic of these levelers that they provide uniform full wave deformation of the strip material in the central portion of the leveler (where the upper rolls are adjustable only vertically); but in the end portions, where the upper rolls are tiltable, the deformation becomes progressively less towards the outside of the leveler. This is reflected in the indicated amplitude of the deformation waves in the strip shown in FIG. 21. Accordingly, the assigned torque values of the work rolls will progressively increase from zero at the entry end to a maximum at a short distance from that end and will remain uniform over the central part of the leveler, and then progressively decrease to zero at the exit end. The total indicated torque requirement of the leveler is 5.0T. Of this total, the torque requirements of the first and last roll clusters, amounting to 0.25T each, may be ignored for practical purposes, leaving a total torque requirement of 4.5T.

Figure 22:
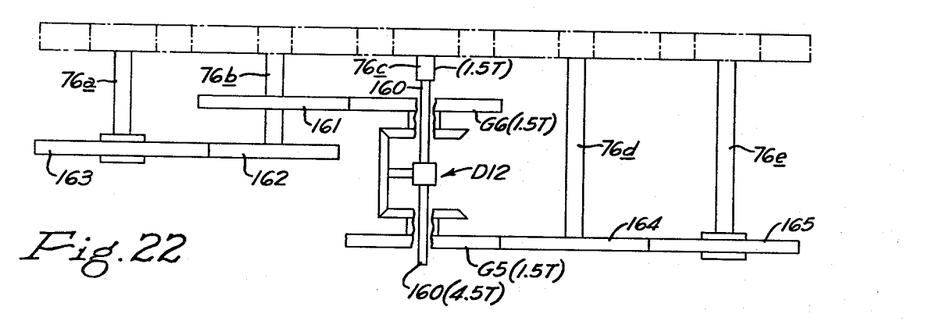
FIG. 22 is a diagrammatic plan view of a suitable drive arrangement for the leveler shown in FIG. 21, in which the drive shafts of the gearing for the six separate roll clusters may be connected to a power source or brake through a combination of regular, differential, and overrunning clutch gears.

FIG. 22 shows one arrangement for dividing an input torque of 4.5T between the roll clusters of the leveler shown in FIG. 21. In this and the following arrangement in FIG. 23, use is made of an equal torque differential, which is shown more representationally in FIG. 24. It is generally similar in construction to the unequal torque differential of FIG. 25 previously described, except that the equal torque differential has output pinions P5 and P6 of equal diameter (these pinions being provided with output gears G5 and G6, respectively) and the shaft of its differential pinion P4 is normal to the input shaft.

Referring to FIG. 22, the input torque of 4.5T is delivered to input shaft 160 of the equal torque differential D12 and divided therein into three equal torque outputs of 1.5T each. One of those outputs is transmitted through output gear G6 and spud gear 161 to drive shaft 76b of the second roll cluster. Because the upper rolls of the entry cluster are tilted in the double-tilt leveler and the work rolls therein make only minimal contact with the strip, it is important that the work rolls rotate at a speed dictated by the forward tension on the strip. This can be assured if they are driven at a slower speed through an overrunning clutch. Accordingly, the ratio between spur gear 162 and overrunning clutch gear 163 is less than 1:1, so that drive shaft 76a of the first roll cluster will normally rotate faster (as it is permitted to do by the overrunning clutch) than the gear portion of the clutch gear. Such an arrangement assures that the work rolls of the first roll cluster will be driven at a minimum surface speed (determined by the rotation of the gear portion of clutch gear 163), but allowance is made for normal speed variations above that minimum, allowing the work rolls to rotate faster because of frictional surface engagement with the faster moving strip. In other words, the work rolls will not normally be driven by the gearing at a surface speed faster than the linear speed of the strip. The second output of 1.5T from differential D12 is taken from an extension of input shaft 160 and is delivered to drive shaft 76c of the third roll cluster. The third output of 1.5T from the same differential is transmitted through its output gear G5 and spur gear 164 to drive shaft 76d of the fourth roll cluster. Spur gear 164 also drives an overrunning clutch gear 165, which is connected to drive shaft 76e of the fifth and last roll cluster.

Figure 23:
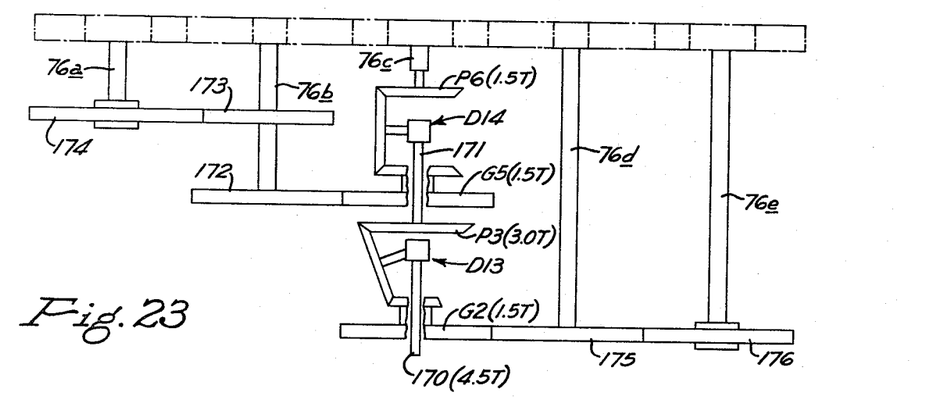
FIG. 23 is a similar view of a modified drive arrangement of the leveler of FIG. 21.
Figure 24:
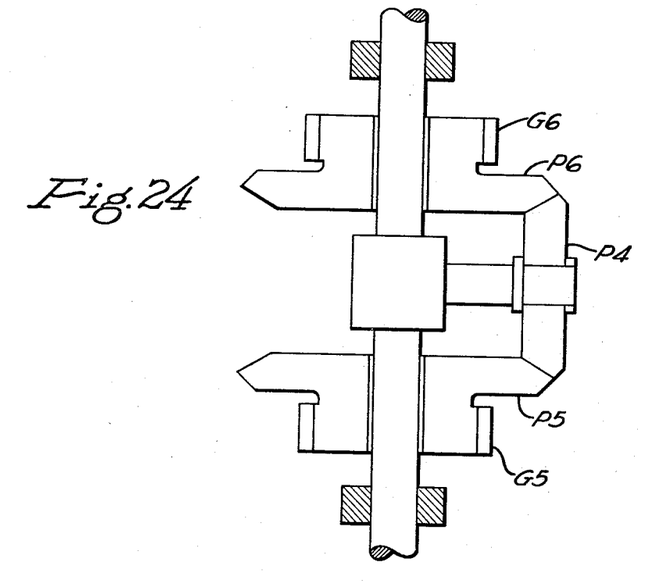
FIG. 24 is a somewhat diagrammatic view of the details of a differential gear of the type shown in FIGS. 22 and 23, for providing equal torque outputs.

A modification of the foregoing arrangement is shown in FIG. 23, where the torque input of 4.5T is delivered to the input shaft 170 of an unequal torque differential D13, where it is divided into output torques of 1.5T and 3.0T. The larger of those outputs is delivered through the shaft of output pinion P3 to input shaft 171 of an equal torque differential D14, where it is subdivided into two outputs of 1.5T each. One of the latter outputs is transmitted through output gear G5 and spur gear 172 to drive shaft 76b of the second roll cluster. As in FIG. 22, there is mounted on that shaft a second spur gear, here designated 173, which drives an overrunning clutch gear 174 connected to the shaft 76a of the first roll cluster. Again, as in FIG. 22, the ratio of gear 173 to gear 174 is less than unity, so that the overrunning clutch gear 174 will revolve slower than spur gear 173. The second output torque of 1.5T from differential D14 is transmitted by the shaft of output pinion P6 to drive shaft 76c of the third roll cluster. The smaller torque output of 1.5T from differential D13 is transmitted through its output gear G2 and spur gear 175 to drive shaft 76d of the fourth roll cluster. Spur gear 175 also drives an overrunning clutch gear 176 connected to drive shaft 76e of the fifth and last roll cluster.

In many leveling operations the strip is subjected to tension as it passes through the leveler by the pull of a takeup reel or tension bridle beyond the exit end of the leveler and also by the drag of a payoff reel or bridle before the entry end of the leveler. The drag is frequently referred to as back tension. Under certain circumstances, it may be desirable to provide all or some of such back tension by means of drag by the work rolls of the leveler itself. In such case, the work rolls, instead of being driven in a direction to aid passage of the strip through the leveler, may be connected to braking or loading means, such as a mechanical brake or an electrical generator. For example, mechanical braking or electrical loading means may be connected in place of the power source, to the main drive shaft 101 in FIG. 13 and to the corresponding drive shafts in FIGS. 14, 16–17, 19–20, and 22–23. The amount of such braking or loading, in addition to the load of the leveler itself, can be adjusted by conventional means to balance the forward tension applied to the strip at the exit side of the leveler.

It is among the advantages of this invention that it provides a method and apparatus for flattening strip materials that overcomes many problems previously encountered in this field due to strip elongation in passing through a roller leveler. The present invention provides closer accommodation between the strip speed and the surface speed of the rolls with which the strip is in contact, to avoid marking the strip; yet it assures sufficient slippage between the strip and rolls to make the rolls self-cleaning.

The foregoing advantages are obtained when the power required to pass the strip through the leveler is supplied either in the form of tension on the delivery end of the strip or in the form of power applied to the work rolls of the leveler, or in combinations of these two forms of power application. Moreover, where substantial power is supplied to the work rolls, the present invention provides means for distribtuing positive driving torques among the roll clusters in ratios approximately corresponding to the torques required to produce the adjacent deformation of the strip material. In this connection, special arrangements have been described illustrating suitable drive means for different types of levelers including those of the exit-tilt type, double-tilt type, and single-tilt type. Alternatively, where the strip is to be pulled through the leveler with a predetermined amount of back tension, that tension may be provided in whole or in part by braking or loading means applied to the work rolls of the leveler through differential gearing that will permit the rolls in separate clusters to rotate at speeds approximating the average speed of the strip through the clusters and that will also permit the total loading or braking torque to be distributed among the roll clusters in predetermined ratios approximating the work performed in deforming the strip as it passes through each cluster.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The method of leveling strip material in a roller leveler that includes the following steps: passing the strip material under tension between successive clusters of opposed staggered and rotatable work rolls for flexing the strip beyond its yield point, thereby progressively increasing the length and linear speed of the strip as it passes through the leveler, and controlling the rotation of the work rolls in each cluster to a surface speed that approximates the average linear speed of the strip through that cluster.

2. The method of leveling strip material in a roller leveler that includes the following steps: passing the strip material under tension between successive clusters of opposed staggered and rotatable work rolls for flexing the strip beyond its yield point, thereby progressively increasing the length and linear speed of the strip as it passes through the leveler, and controlling the rotation of the work rolls so that all of the work rolls in the same cluster will rotate at the same surface speed that approximates the average linear speed of the strip through that cluster and so that the work rolls in a subsequent cluster will rotate faster than those in a preceding cluster.

3. The method of leveling strip material in a roller leveler that includes the following steps: passing the strip material under tension between successive clusters of opposed staggered and rotatable work rolls for flexing the strip beyond its yield point, thereby progressively increasing the length and linear speed of the strip as it passes through the leveler, driving the work rolls in each cluster at a minimum surface speed that approximates the linear speed of the strip as it enters the leveler, while permitting the work rolls in each cluster to be driven by frictional engagement with the strip at a surface speed higher than said minimum speed and higher than the surface speed of the rolls in a preceding cluster.

4. The method of leveling strip material in a roller leveler in which the strip is passed under tension from the entry to the exit side of the leveler between opposed staggered and rotatable work rolls for flexing the strip beyond its yield point, thereby progressively increasing the length and linear speed of the strip as it passes through the leveler, said method comprising the following steps: controlling the rotation of a plurality of adjacent work rolls constituting a first roll cluster located near the entry side of the leveler so that all rolls in that cluster rotate at the same surface speed that approximates the average linear speed of the strip through that cluster, and controlling the rotation of a second plurality of adjacent work rolls constituting a second roll cluster located towards the exit side of the leveler from the first cluster so that all rolls in the second cluster rotate at the same surface speed that approximates the linear speed of the strip through the second cluster but is slightly higher than the surface speed of the rolls in the first cluster.

5. The method of leveling strip material in a roller leveler in which the strip is passed under tension between opposed staggered and rotatable work rolls for flexing the strip beyond its yield point, thereby progressively increasing the length and linear speed of the strip as it passes through the leveler, said method comprising the following steps: controlling the rotation of a plurality of adjacent work rolls constituting a first roll cluster located near the entry side of the leveler so that all rolls in that cluster rotate at the same surface speed that approximates the average linear speed of the strip through that cluster, and controlling the rotation of a second plurality of adjacent work rolls constituting a second roll cluster located towards the exit side of the leveler from the first cluster so that all rolls in the second cluster rotate at the same surface speed that approximates the linear speed of the strip through the second cluster but is slightly higher than the surface speed of the rolls in the first cluster, the surface speed of the rolls in each of said clusters differing slightly from the actual linear speed of the strip in the area of contact between the strip and each roll to provide slippage between strip and rolls to make the rolls self-cleaning.

6. The method according to claim 5 that also includes the step of driving both clusters of work rolls to cause them to rotate at a minimum surface speed that approximates the linear speed of the strip as it enters the leveler.

7. The method of leveling strip material in a roller leveler in which the strip is passed under tension between opposed staggered and rotatable work rolls for flexing the strip beyond its yield point, thereby progressively increasing the length and linear speed of the strip as it passes through the leveler from the entry to the exit side, said method comprising the following steps: controlling the rotation of a plurality of adjacent work rolls constituting a first roll cluster located near the entry side of the leveler so that all rolls in that cluster rotae at he same surface speed, conrolling the rotation of a second plurality of adjacent work rolls constituting a second roll cluster located towards the exit side of the leveler from the first cluster so that all rolls in the second cluster rotate at the same surface speed, and driving the rolls in each cluster by frictional engagement with the strip passing through that cluster, whereby the rolls in the second cluster will rotate at a slightly higher speed than the rolls in the first cluster and the surface speed of the rolls in each of said clusters will differ slightly from the actual linear speed of the strip in the area of contact between the strip and each roll to provide slippage between strip and rolls to make the rolls self-cleaning.

8. The method of leveling strip material in a roller leveler in which the strip is passed under tension between opposed staggered and rotatable work rolls for flexing the strip beyond its yield point, thereby progressively increasing the length and linear speed of the strip as it passes from the entry to the exit side of the leveler, said method comprising the following steps: controlling the rotation of a plurality of adjacent work rolls constituting a first roll cluster located near the entry side of the leveler so that all rolls in that cluster rotate at the same surface speed, controlling the rotation of a second plurality of adjacent work rolls constituting a second roll cluster located towards the exit side of the leveler from the first cluster so that all rolls in the second cluster rotate at the same surface speed, driving the rolls in each cluster by external means at a minimum surface speed that approximates the linear speed of the strip adjacent the entry side of the leveler, and also permitting the rolls in the second cluster to be driven by frictional engagement with the strip at a surface speed slightly higher than the surface speed of the rolls in the first cluster, the surface speed of the rolls in each of said clusters differing slightly from the actual linear speed of the strip in the area of contact between the strip and each roll to provide slippage between strip and rolls to make the rolls self-cleaning.

9. The method of leveling strip material in a roller leveler in which the strip is passed under tension between opposed staggered and rotatable work rolls for flexing the strip beyond its yield point, thereby progressively increasing the length and linear speed of the strip as it passes from the entry to the exit side of the leveler, said method comprising the following steps: controlling the rotation of a plurality of adjacent work rolls in a plurality of roll clusters extending between the entry and exit sides of the leveler so that all rolls in a given cluster rotate at the same surface speed, driving the rolls in each cluster from a common source through torque-applying means (1) that distribute the total applied torque among the separate roll clusters in a predetermined ratio that corresponds approximately to the torque required by each roll cluster to produce the adjacent deformation of the strip material as it passes through that cluster and (2) that at the same time permit the rolls in the second of two successive clusters to be driven by frictional engagement with the strip at a surface speed slightly higher than the surface speed of the rolls in the first of said two successive clusters.

10. The method according to claim 9, in which the surface speed of each roll in a given cluster differs slightly from the actual linear speed of the strip in the area of contact between the strip and roll to provide slippage therebetween for making the rolls self-cleaning.

11. The method of leveling strip material in a roller leveler in which the strip is passed under tension between opposed staggered and rotatable work rolls for flexing the strip beyond its yield point, thereby progressively increasing the length and linear speed of the strip as it passes from the entry to the exit side of the leveler, said method comprising the following steps: controlling the rotation of a plurality of adjacent work rolls in a plurality of roll clusters extending between the entry and exit sides of the leveler so that all rolls in a given cluster rotate at the same surface speed, braking the rolls in each cluster to provide back tension on the strip through torque restraining means connected between the rolls and a common load source and at the same time permitting the rolls in the second of two successive roll clusters to be driven by frictional engagement with the strip at a surface speed slightly higher than the surface speed of the rolls in the first of said two successive clusters.

12. The method according to claim 11, in which the torque-restraining means distributes the total load from the common load source among the several roll clusters in a predetermined ratio that corresponds approximately to the torque required by each roll cluster to produce the adjacent deformation of the strip material passing through that cluster.

13. A roller leveler comprising two opposed banks of work rolls, the rolls in the first bank being in spaced staggered relation to the rolls in the second bank for flexing beyond its yield point strip material passing between the banks of rolls, said rolls being divided into a plurality of separate roll clusters, each cluster including at least two rolls, and drive means interconnecting the rolls in each cluster, with the rolls of one cluster being rotatable at a different speed from the rolls in an adjacent cluster.

14. A roller leveler according to claim 13, in which each roll cluster includes two adjacent work rolls, one of which is in the first bank and the other is in the second bank of rolls.

15. A roller leveler according to claim 13, in which each roll cluster includes two adjacent work rolls in the same bank of rolls.

16. A roller leveler according to claim 13, in which each roll cluster includes three adjacent work rolls, two rolls being in the first bank and the third roll being in the second bank of rolls.

17. A roller leveler according to claim 13, in which each roll cluster also includes at least three backing rolls in surface engagement with at least one work roll in the same cluster.

18. A roller leveler according to claim 13, in which each roll cluster includes four work rolls, two in the first bank of rolls and two in the second bank of rolls.

19. A roller leveler according to claim 14, in which each roll cluster also includes four backing rolls, two in the first bank and two in the second bank of rolls.

20. A roller leveler according to claim 13 that also includes second drive means interconnecting one roll in each of two adjacent clusters for imposing a predetermined minimum rotational speed on the rolls of both clusters, said second drive means including overrunning clutch means permitting the rolls in one of said clusters to rotate at a higher speed than the rolls in the other of said clusters.

21. A roller leveler according to claim 13, in which said drive means interconnects the rolls in the same cluster for rotation at the same surface speed.

22. A roller leveler comprising two opposed banks of work rolls, the rolls in the first bank being in spaced staggered relation to the rolls in the second bank for flexing beyond its yield point strip material passing under tension between the banks of rolls, the strip thereby progressively increasing in length and linear speed as it passes through the leveler, said work rolls being divided into a plurality of separate roll clusters extending from the entry to the exit sides of the leveler so that each cluster includes at least two adjacent work rolls, separate drive means associated with each cluster for interconnecting the rolls in that cluster for rotation at the same surface speed, and torque applying means interconnecting the work rolls in each cluster with a common external drive shaft for positively driving said rolls, said torque applying means (1) distributing the total applied torque from said shaft among the separate roll clusters in a predetermined ratio that corresponds approximately to the torque required by each roll cluster to produce the adjacent deformation of the strip material passing through that cluster and (2) permitting at the same time the rolls in the second of two successive roll clusters to be driven by frictional engagement with the strip at a speed slightly higher than the surface speed of the rolls in the first of said two successive roll clusters.

23. A roller leveler according to claim 22, in which said torque applying means include at least one differential gear assembly having unequal torque outputs.

24. A roller leveler according to claim 22, in which said torque applying means include at least one differential gear assembly having equal torque outputs.

25. A roller leveler according to claim 22, in which said torque applying means include a plurality of differential gear assemblies having unequal torque outputs with the input of one of said gear assemblies being connected to an output of another of said assemblies.

26. A roller leveler according to claim 22, in which said torque applying means include at least one differential gear assembly having unequal torque outputs and at least one overrunning clutch gear connected to one of said outputs.

27. A roller leveler comprising two opposed banks of work rolls, the rolls in the first bank being in spaced staggered relation to the rolls in the second bank for flexing beyond its yield point strip material passing under tension between the banks of rolls, the strip thereby progressively increasing in length and linear speed as it passes through the leveler, said work rolls being divided into a plurality of separate roll clusters extending from the entry to the exit sides of the leveler, each cluster including at least two adjacent rolls, separate drive means associated with each cluster for interconnecting the rolls in that cluster for rotation at the same surface speed, a common braking source, and torque restraining means interconnecting said source with said rolls for positively braking the rolls in each cluster, said torque restraining means (1) distributing the total braking load from said source among the separate roll clusters in a predetermined ratio that corresponds approximately to the torque required by each roll cluster to produce the adjacent deformation of the strip material passing through that cluster and (2) permitting at the same time the rolls in the second of two successive roll clusters to be driven by frictional engagement with the strip at a speed slightly higher than the surface speed of the rolls in the first of said two successive roll clusters.

28. A roller leveler according to claim 27, in which said torque restraining means include at least one differential gear assembly having unequal torque inputs.

29. A roller leveler according to claim 27, in which said torque restraining means include a plurality of differential gear assemblies having unequal torque inputs with the output of one of said gear assemblies being connected to an input of another of said assemblies.

30. A roller leveler according to claim 27, in which said torque restraining means include at least one differential gear assembly having unequal torque inputs and at least one overrunning clutch gear connected to one of said inputs.

31. A roller leveler according to claim 27, in which said torque restraining means include at least one differential gear assembly having equal torque inputs.

References Cited

UNITED STATES PATENTS

| 2,742,949 | 4/1956 | Nilsson | 72—165 |
| 3,031,009 | 4/1962 | Muddiman | 72—165 |

CHARLES W. LANHAM, *Primary Examiner.*

R. D. GREFE, *Assistant Examiner.*